United States Patent
Menninga et al.

(12) 
(10) Patent No.: US 6,465,033 B2
(45) Date of Patent: Oct. 15, 2002

(54) METHOD AND APPARATUS FOR PRODUCING CHEESE

(75) Inventors: Hugo Menninga, Sneek (NL); Steven Acreman, Wayford Crewkerne (GB)

(73) Assignee: Tetra Laval Holding & Finance S.A., Pully (CH)

( * ) Notice: Subject to any disclaimer, the term of this patent is extended or adjusted under 35 U.S.C. 154(b) by 0 days.

(21) Appl. No.: 09/986,343

(22) Filed: Nov. 8, 2001

(65) Prior Publication Data

US 2002/0058096 A1 May 16, 2002

(30) Foreign Application Priority Data

Nov. 8, 2000 (NL) .............................................. 1016559

(51) Int. Cl.[7] ................................................ A21J 25/00
(52) U.S. Cl. .......................... 426/512; 99/456; 99/458; 99/465; 425/408; 426/515
(58) Field of Search ................................. 426/512, 515, 426/582; 99/456, 458, 465; 425/408

(56) References Cited

U.S. PATENT DOCUMENTS 3,650,030 A * 3/1972 Delamere .................... 426/512
4,750,415 A * 6/1988 Ostemar ....................... 99/465

FOREIGN PATENT DOCUMENTS

FR     2 258 784 A    8/1975
GB     1 423 958 A    2/1976

OTHER PUBLICATIONS

European Search Report dated Jun. 15, 2001.

* cited by examiner

Primary Examiner—George C. Yeung
(74) Attorney, Agent, or Firm—Pennie & Edmonds LLP

(57) ABSTRACT

A method and apparatus for producing cheese, suitable in particular for producing crumbly cheese. Cheese molds are filled with curd, are subsequently closed with a lid and are pressed, whereafter the obtained cheeses are removed from the cheese molds. Prior to removing the cheeses from the cheese molds, however, the cheese molds still filled with cheese are heated.

20 Claims, 1 Drawing Sheet

METHOD AND APPARATUS FOR PRODUCING CHEESE

FIELD OF THE INVENTION

This invention relates to a method for producing cheese, wherein cheese molds are filled with curd, are subsequently closed with a lid and are pressed, whereafter the obtained cheeses are removed from the cheese molds. This invention further relates to an apparatus for producing cheese.

BACKGROUND OF THE INVENTION

A problem occurring in the production of some types of cheese is that in the traditional methods of 'unpacking' the pressed cheeses, i.e., removing them from the cheese molds, the cheese is often damaged. According to the traditional methods, the cheeses are, for instance, blown from the cheese molds using compressed air or pushed from the cheese molds using a loose bottom.

The problem outlined occurs in particular in the production of the types of cheese that crumble easily. Such cheese types are usually designated by the term 'crumbly cheese'. This is a general designation for cheese types which, in particular when removing the cheeses from the cheese molds, are susceptible of mechanical damage. Examples include, inter alia, Lancashire cheese, Cheshire cheese, Caerphilly cheese.

Such cheese types are produced in round or rectangular cheese molds, often manufactured from stainless steel. According to the traditional method, a cloth is laid in the empty molds and then the mold is filled with curd. The cloth is folded around the cheese and then the molds are brought into gang presses and pressed. No lids are placed on the molds, for the bottom of one mold functions as lid for the mold behind it. After pressing, the cheeses are cooled in a cold store for at least 7 hours, so that the cheese acquires sufficient firmness. The cheese is then carefully taken out of the mold, the cloth is peeled off, and in the case of round cheese, very carefully, a supporting wrap is fitted manually. It has been endeavored to devise a method whereby pressing in the gang presses is avoided, partly because the presses must be loaded manually. Manually unpacking and manually fitting the supporting wrap also meet with objections because this procedure involves an actual risk of contamination of the cheese.

For that reason, an automatic pressing system, and cheese molds suitable therefor, has been chosen. The curd is then charged to round or rectangular molds without applying cloth. The molds have lids which bear directly on the curd and which can be put under mechanical pressure in the usual manner. In this procedure, however, both removing the lid and releasing the cooled cheese by blowing have proven not to be properly possible without damaging the cheese.

SUMMARY OF THE INVENTION

Accordingly, there is need for an improved unpacking method, in particular for cheese types which are susceptible to mechanical damage, whereby damage is prevented or at least the chance of damage is considerably reduced. To that end, according to the invention, a method of the above-described type is characterized in that prior to removing the cheeses from the cheese molds, the cheese molds still filled with cheese are heated.

An apparatus for producing cheese comprising at least one filling station for filling the cheese molds with curd and arranging a lid on the curd in the cheese molds; at least one pressing device for pressing the cheese in the cheese molds and at least one unpacking station for removing the cheese from the cheese molds, as well as conveying means for conveying the cheese molds through the apparatus, is characterized, according to the invention, by a heating device for heating the filled cheese molds after they have left the pressing device and before they reach the unpacking station.

BRIEF DESCRIPTION OF THE DRAWINGS

The invention is described with reference to the attached FIG. 1 which shows an embodiment of an automated cheese production line in accordance with the present invention that is configured to practice the method of the present invention.

DETAILED DESCRIPTION OF THE PREFERRED EMBODIMENT

Figure 1:
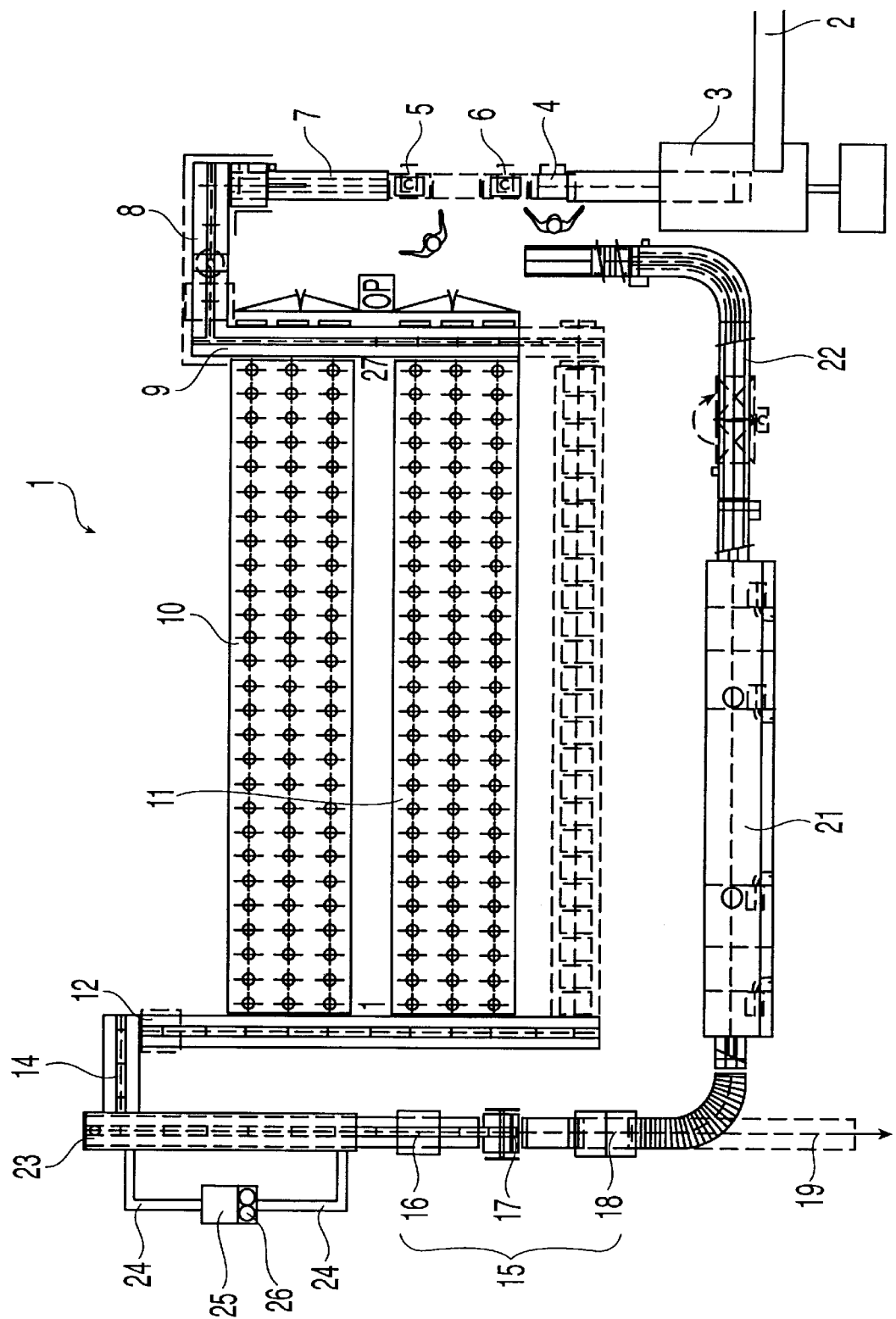

It is noted that the invention is also applicable to cheese types, whether or not susceptible to mechanical damage, other than the cheese types specifically mentioned, as, for instance, to cheddar cheese types.

FIG. 1 shows schematically in top plan view an example of an automated cheese production line 1 which is arranged for practicing the method according to the invention. The apparatus shown comprises a curd feed conveyor 2, a mixer/blender 3, a filling station 4 in which the curd mixture provided by the mixer/blender is charged to cheese molds. This is typically done manually but in principle an automated filling station could be used. In a next station 5, each cheese mold is provided with a lid, mostly called follower. Placing the followers can again be done manually or with the aid of an automated system.

Optionally, a brief prepressing step can be carried out intermediately in a prepressing station 6.

The thus filled cheese molds provided with followers are then fed to a pressing device. In the example shown, three conveyors 7, 8, 9 are shown which feed the cheese molds to two pressing devices 10, 11. The pressing devices can be known per se, for instance tunnel-shaped, in which a large number of molds, for instance about 80, can be pressed simultaneously.

When closed pressing devices are used, the possibility arises of conditioning the air in the pressing device. Often, a cool environment is desirable, and the air in the pressing devices is cooled to, for instance, 6° C. If desired, the cheeses, after pressing, can be cooled still longer in a refrigerated space not further shown.

After pressing, the cheese molds leave the pressing devices and are conveyed by suitable conveying means, such as conveyor tracks 12, 14, to an unpacking station 15. The pressing devices in this example are arranged in the usual manner as feed-through pressing devices, the cheese molds entering the devices at one end and leaving them at the other, opposite end. If desired, however, the pressing devices can also be designed in a different manner.

In the unpacking station, the pressed cheeses are taken from the cheese molds. To that end, in the example shown, first, in a station 16 the follower (the lid) is removed from each cheese mold. Next, in an inverting station 17, the cheese mold is inverted, and in a subsequent removing station 18 the cheese mold is taken off the cheese. The thus obtained cheeses are discharged via a conveyor 19 and the cheese molds and the lids are passed via suitable conveying means 20 to a rinsing machine 21 to be cleaned. After cleaning, the cheese molds and the lids can be fed to the filling station 4 again for reuse. For this purpose, schematically a conveyor track 22 is shown.

In the traditional unpacking methods, use is made of compressed air to blow the cheeses out of the molds, or in the cheese molds a loose bottom is used by means of which the cheese can be pushed from a cheese mold. In practice, this gives rise to damages with some types of cheese. In a method and apparatus according to the invention) such damages are prevented by heating the cheese molds prior to unpacking.

To that end, in the example shown, a heating device 23 is used, in which each cheese mold with follower and cheese is heated using hot air. The heating space is preferably, as schematically shown, a feed-through device which can be designed, for instance, as a closed tunnel. Such a tunnel can be provided with an air circulation system with ducts 24, an air heating device 25 and one or more fans 26, as schematically shown in the figure.

Further, the usual control devices for temperature, air flow rate, humidity, etc., are provided.

The heating device 23 in the example shown is further provided with a conveyor to carry the cheese molds through the device.

The conveyor may be arranged to pass the cheese molds by steps through the heating device, but it is also possible to employ a continuously working conveyor or a conveyor which can work both continuously and by steps.

Further, if desired, it is possible to provide the heating device, for instance, with successive zones in which prevail different temperatures, for instance rising from one zone to the next.

The heating device may be arranged as a feed-through device to which continuously, though optionally with short intervals, groups of one or more cheese molds are fed, while simultaneously molds already heated are discharged. Alternatively, the heating device can also be filled completely with cheese molds, which are then all heated simultaneously, whereafter all molds are discharged from the heating device before the heating device is filled again. In this case, if desired, the temperature could be raised by steps during the heating process.

These and similar variants will readily occur to those skilled in the art. It has been found that the cheeses, after heating of the filled cheese molds, can be simply removed from the cheese molds without damage, or at least with a considerably reduced chance of damage. If desired, when taking the molds off the cheeses, additionally blowing with compressed air at a low pressure can be effected.

As an alternative to the use of heated air, other suitable heating methods can be used. For instance, infrared heaters or steam can be used. In the latter case, however, the rind of the cheese might be affected by condensed steam.

What is claimed is:

1. A method for producing cheese in cheese molds comprising the steps of:
   filling a plurality of cheese molds with curd;
   closing the curd-filled cheese molds with a lid;
   pressing the cheese molds after they have been closed;
   heating the cheese molds after they have been pressed; and
   removing the cheese from the cheese molds after they have been heated.

2. A method according to claim 1, wherein the heating step comprises heating the cheese molds in a tunnel-shaped device.

3. A method according to claim 1, further comprising a step of advancing the filled and pressed cheese molds through the tunnel-shaped device during the heating steps.

4. A method according to claim 1, wherein the step of heating the cheese molds comprises applying heated air to the cheese molds.

5. A method according to claim 1, further comprising a step of cooling the cheese molds before the heating step, the step of cooling taking place during, subsequent to, or both during and subsequent to, the pressing step.

6. A method according to claim 1, further comprising the steps of:
   cooling the cheese molds to about 6° C. before the heating step, the step of cooling taking place during, subsequent to, or both during and subsequent to, the pressing step;
   applying head a to the cheese molds during the heating step, the heated air being applied in a tunnel-shaped device; and
   advancing the filled and pressed cheese molds through the tunnel-shaped device during the heating step.

7. A cheese-producing apparatus comprising:
   at least one filling station for filling cheese molds with curd;
   at least one station for covering the curd in the cheese molds;
   at least one pressing device for pressing the cheese in the cheese molds;
   at least one unpacking station for removing the cheese from the cheese molds;
   at least one conveyer for conveying the cheese molds through the apparatus; and
   at least one heating device configured to heat the cheese molds after they have left the pressing device and before they reach the unpacking station.

8. The cheese-producing apparatus according to claim 7, wherein the heating device comprises a tunnel-shaped device through which the cheese molds are transported on at least one conveyor while the cheese molds are being heated.

9. The cheese-producing apparatus according to claim 8, wherein the heating device further comprises an air heating device, air ducts and at least one fan for delivering heated air to the tunnel-shaped device.

10. The cheese-producing apparatus according to claim 7, wherein the unpacking station comprises an inverting station for inverting filled cheese molds and a removing station for removing the cheese molds from the cheeses.

11. The cheese-producing apparatus according to claim 10, wherein the removing station is configured to apply low-pressure compressed air between a cheese mold and a cheese present therein, to thereby promote separation of the cheese from the cheese mold.

12. The cheese-producing apparatus according to claim 7, further comprising at least one cooling device configured to cool the cheese molds before they are heated by the at least one heating device.

13. The cheese-producing apparatus according to claim 12, wherein the cooling device cools air in the pressing device to about 6° C. to thereby cool the cheese molds while they are in the pressing device.

14. The cheese-producing apparatus according to claim 12, wherein the cooling device cools the cheese molds while they are in the pressing device.

15. The cheese-producing apparatus according to claim 12, wherein the cooling device cools the cheese molds after the cheese molds have been pressed.

16. The cheese-producing apparatus according to claim 7, further comprising at least one rinsing machine configured to clean the cheese molds after the cheese has been removed at the unpacking station.

17. The cheese-producing apparatus according to claim 7, further comprising:
- at least one cooling device configured to cool the cheese molds before they are heated by the at least one heating device; and
- at least one rinsing machine configured to clean the cheese molds after the cheese has been removed at the unpacking station;

wherein:
- the heating device comprises a tunnel-shaped device through which the cheese molds are transported on at least one conveyor while the cheese molds are being heated, an air heating device, air ducts and at least one fan for delivering heated air to the tunnel-shaped device; and
- the unpacking station comprises an inverting station for inverting filled cheese molds and a removing station for removing the cheese molds from the cheeses, the removing station being configured to apply low-pressure compressed air between a cheese mold and a cheese present therein, to thereby promote separation of the cheese from the cheese mold.

18. The cheese-producing apparatus according to claim 17, wherein the cooling device cools air in the pressing device to about 6° C. to thereby cool the cheese molds while they are in the pressing device.

19. The cheese-producing apparatus according to claim 17, wherein the cooling device cools the cheese molds while the cheese molds are in the pressing device.

20. The cheese-producing apparatus according to claim 17, wherein the cooling device cools the cheese molds after the cheese molds have been pressed by the pressing device.

* * * * *